Sept. 24, 1968  B. W. BLAIR ET AL  3,402,662
RECORD READER/IMPRINTER WITH GATE CONTROLLED ROLLER
Filed Jan. 31, 1967  3 Sheets-Sheet 1

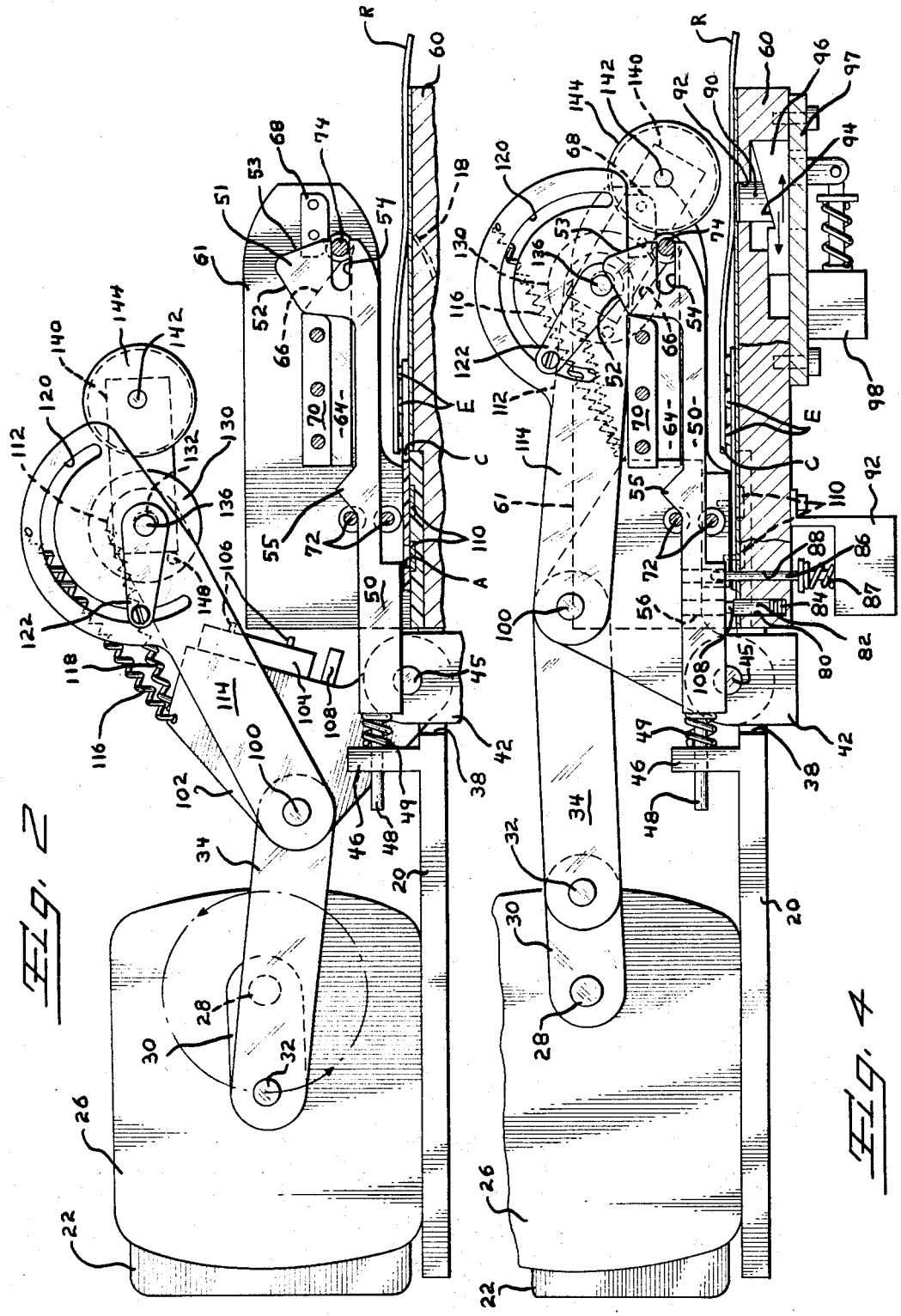

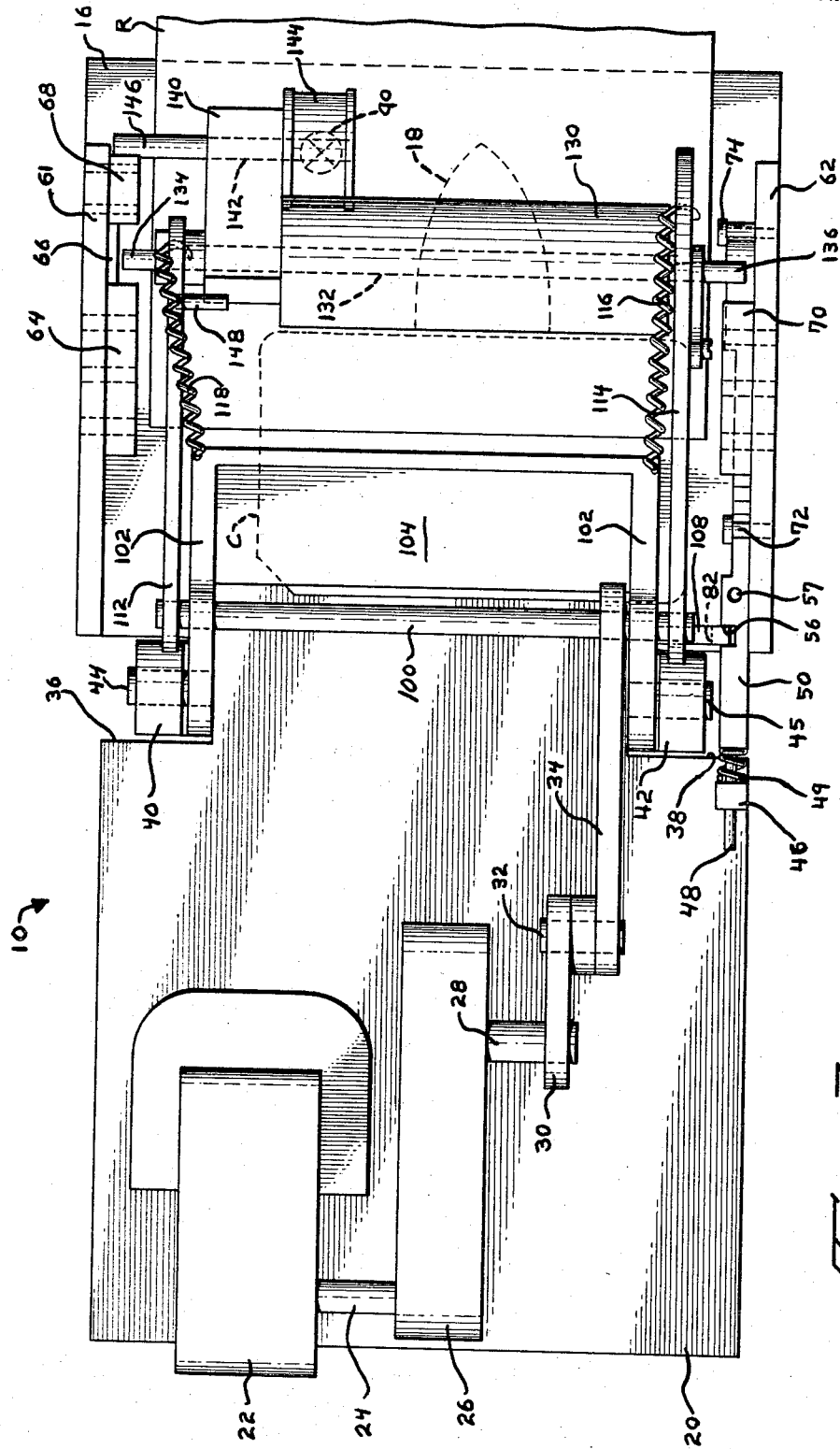

United States Patent Office 3,402,662
Patented Sept. 24, 1968

3,402,662
RECORD READER/IMPRINTER WITH GATE CONTROLLED ROLLER
Bryce Wilson Blair, Hershey, and Lindsay Carlton Friend, Camp Hill, Pa., assignors to AMP Incorporated, Harrisburg, Pa.
Filed Jan. 31, 1967, Ser. No. 613,022
18 Claims. (Cl. 101—285)

ABSTRACT OF THE DISCLOSURE

An apparatus is disclosed which is capable of first reading a record, such as a personal credit card having punched holes therein and an embossment thereon to identify the card holder and then, depending upon the credit status of the card holder, cause a second record, such as a retail slip, to be imprinted by the embossment on the credit card or to prevent such imprinting and thereby block completion of a credit transaction. The apparatus includes as a separate feature an auxiliary roller and imprinting symbol under the control of a solenoid to selectively mark the retail slip to limit the amount of credit extended in the transaction. The apparatus disclosed is comprised of a housing containing a support platen to receive and position the credit card and retail slip, a motor and drive mechanism connected to a reader head and to a first and second roller pivotally mounted relative to said platen and operated by said mechanism to effect a reading and/or imprinting of records placed thereon. The rollers are supported by a shaft made to engage rails supported above the base and projecting inwardly. A gate mechanism operated from a rear and relatively inaccessible portion of the housing is positioned for sliding movement to prevent or permit roller engagement with records on the base.

---

This invention relates to apparatus for imprinting and/or reading records such as the records utilized in commercial credit transactions.

It is an object of the invention to provide apparatus for imprinting and/or reading records which includes a simple and reliable mechanism for causing or preventing imprinting action in either or both of two distinct areas on a record.

It is a further object to provide an apparatus for imprinting and/or reading which is controllable to provide a selected imprinting of a record in different areas through a reliable mechanism having few components.

It is another object to provide a reader/imprinter apparatus capable of four distinct variations in response controlled by two control inputs.

It is still another object to provide a reader/imprinter which includes a simple and reliable tamper-proof mechanism to selectively block or permit printing.

It is yet another object to provide a novel spring operated roller drive linkage for imprinting apparatus which is relatively free from vertical confinement during travel to a printing position and then biased at such position by a simple spring system.

Cross-references to related applications

This application relates to applications S.N. 545,391, filed Apr. 26, 1966, in the name of L. C. Friend and S.N. 618,787, filed Feb. 27, 1967, in the name of W. W. Dechert, Jr., et al. The reader head disclosed herein relates to S.N. 441,179, filed Mar. 19, 1965, in the name of W. W. Loose.

In the drawings:

FIGURE 2 is a side view in partial section showing the drive, reader and roller mechanisms in an initial position prior to operation;

FIGURE 3 is a plan view showing the structure of FIGURE 2, as viewed from the top and in the position during the read portion of the operational cycle with the rollers thereof in a position prior to imprinting;

FIGURE 4 is a side view in partial section of the structure similar to that of FIGURE 2 but in the position of operation, as shown in FIGURE 3, and, in addition, showing the interlock mechanism for the gate of the structure and the solenoid imprinting drive for the structure;

Component description

Figure 1:
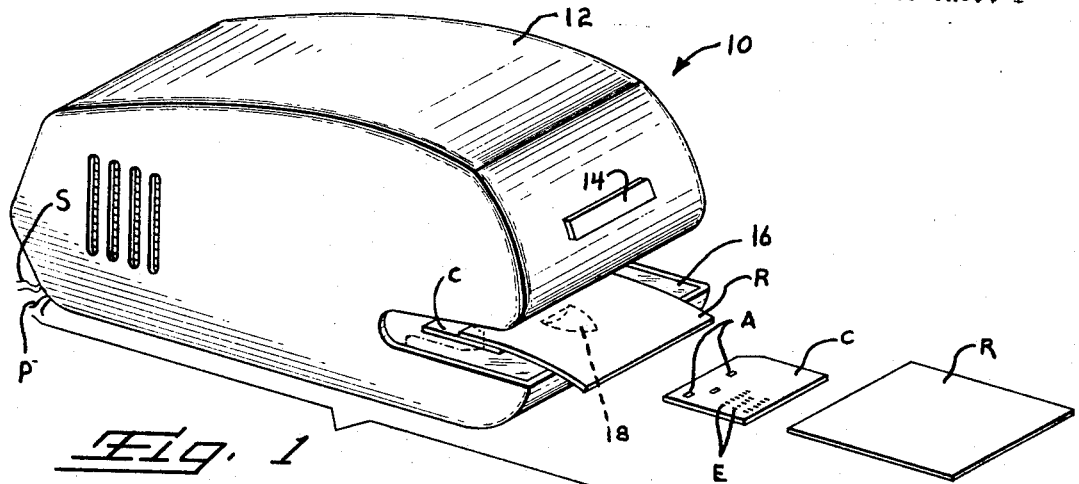
FIGURE 1 is a perspective showing the apparatus housing of the invention with first and second records positioned prior to and after insertion therein.

In FIGURE 1 the unit 10 represents a reader/imprinter. It is contemplated that in a typical use, a unit 10 would be provided at each of a number of remote stations tied to a central accounting center to facilitate credit transactions. An example of such use is in retail stores at each of the numerous cash register locations for different sales departments. The various locations are tied by communication lines to a center where the credit status of customers is stored and available.

The unit 10 includes a housing 12 having at the rear a connection to a power supply lead P and a signal lead S. At the front is an operating button 14 and a record receiving surface 16. The indentation 18 is to facilitate removal of a credit card after insertion. The record receiving arrangement is "open-mouthed" so as to be unrestricted with respect to record width.

The records are comprised of a credit card C having apertures A and an embossment E identifying the card holder and a retail slip R comprised of several sheets permitting multiple copies. With the records positioned as shown in the unit 10 actuation of 14 causes energization of a motor supplied by P to effect a reading of the apertures A of card C. The reading is accomplished by selected closures of electrical circuits depending upon the pattern of apertures A. Signals developed thereby are then sent via S to cause a credit check in the name of the card holder with a control signal being returned via S to 10. This control signal is made to either permit or block an imprinting of the record R by means of a gate within 10 which controls an imprinting roller in print or non-print paths of movement driven by the unit motor. The roller is of the self-inking type which deposits ink on the record R in the pattern of the embossment E of card C.

FIGURES 2 and 3 show the interior of 10 with records C and R inserted from the right into a proper reading and printing position. FIGURE 2 shows the rollers 130 and 144 retracted and FIGURE 3 shows the rollers forward. The records rest on surface 16 which is supported by a base platen 60 rigidly secured to the housing 12 to the left of 60 and mechanically secured thereto by being rigidly secured to 12. Mounted on 20 as shown in FIGURE 3 is a motor 22 connected by a shaft 24 to a gear drive 26. The output of 26 is connected via a shaft 28 to a linkage including a link 30, shaft 32 and a link 34. When the motor 22 is energized the shaft 28 is driven anticlockwise to cause the left end of link 34 to rotate. FIGURE 2 depicts an initial position for the linkage.

The right end of link 34 is pivotally connected to the reader/imprinter mechanism of the unit and supported thereby to provide a reciprocating movement left-to-right and right-to-left as 28 and 30 rotate. As shown in FIGURE 3 the base 20 is relieved on each side as at 36 and 38 to receive pillow blocks 40 and 42 which are anchored to 20 to project above the upper surface thereof as shown in FIGURE 2. Shafts 44 and 45 are fitted into 40 and 42 to support the reader/imprinter mechanism. Adjacent relief 42 is a post 46 projecting upwardly as indicated in FIGURE 2.

Fitted for sliding movement in post 46 is a shaft 48 which is secured to a gate 50 extending to the right out toward the mouth of the unit. As shown in FIGURE 3, the gate is on only one side of the unit. A compression spring 49 is provided between post 46 and the end of 50 which tends to bias the gate to the right.

On each side of base 60 are upstanding walls 61 and 62 which carry rails projecting inwardly of the unit. The wall 60 includes spaced rails 64 and 68 pinned thereto as shown in FIGURES 2 and 3. Each rail has a substantially flat lower surface which serves to receive and guide the imprinting rollers of the unit. The end edge surfaces of the rails are rounded for this purpose. The lower surfaces of the rails are spaced with respect to the upper surfafce of 60 so as to properly bias the rollers downwardly for imprinting. The rail 64 includes a sloped projection portion 66 of less width than the main portion of 60 and leading from the top of the rail to a point beneath the lower surface of 68. As shown in FIGURE 3 the portion 66 engages only the shaft of the auxiliary roller 144.

The rail 70 secured to the wall 62 shown toward the bottom of the view in FIGURE 3 is identical to 64 but without a projecting portion like 66.

The gate 50 is supported for sliding movement by fixed pins 72 and a pin 74 as shown in FIGURES 2 and 3.

The forward end of gate 50 includes a projecting portion 51 which has a rearwardly sloped upper surface 52 and a forwardly sloped upper surface 53. These surfaces are positioned to be engaged by the main roller shaft. A slot 54 is provided in 51 to slidingly engage the pin 74 as shown in FIGURE 2 to support 50 at the forward end thereof. Toward the center of 50 on the upper surface thereof is a projecting surface 55 which limits rearward movement of 50 by engaging the upper pin 72 and causes rearward movement of 50 by being engaged by the main roller shaft on return movement after a printing movement.

Viewing 50 from the top in FIGURE 3 shows a vertical slot 56 and a vertical aperture 57 which serve as a means to unlock gate movement and provide a unit interlock.

Figure 5:
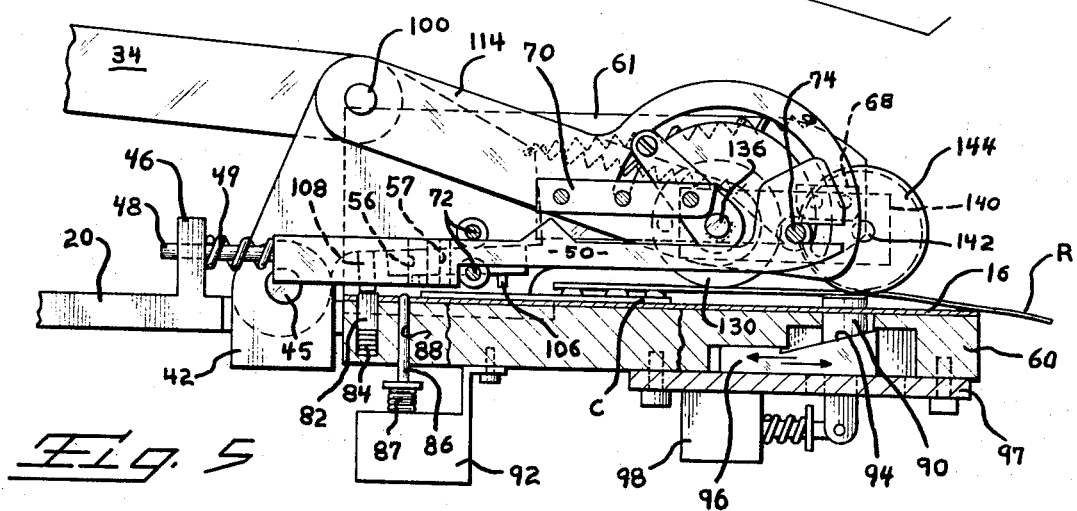
FIGURE 5 is a side view in partial section showing the structure of previous figures at a point of operation just prior to imprinting and after gate operation to permit imprinting.

As shown in FIGURE 4 adjacent pillow block 42 the base 60 includes a vertical slot 80 carrying a sliding block 82 biased upwardly by a compression spring 84. Block 82 is aligned with 56 to slide therewithin and lock 50 against movement under force of spring 49. A downwardly projecting arm 108 fastened to the reader head as shown in FIGURE 5 is positioned to engage and depress 56 when the reader is in reading position.

Aligned with aperture 57 and therebelow is a rod 86 fitted for sliding movement in a aperture 88 on base 60. The rod 86 is biased upwardly by a compression spring 87 and is connected to be drawn downwardly by a solenoid 92 connected thereto. The solenoid 92 is energized only after reading has taken place and an imprint control signal has been supplid thereto. Gate movement forward is thus seen to be dependent upon block 56 being depressed and also withdrawal of 86; the former event being dependent upon reader/imprinter drive movement and the latter being independent of physical movement of such drive. Also note that the interlock mechanism is located well within 10 away from the mouth thereof and thus relatively inaccessibly and "jimmy" proof.

Also secured beneath 60, to the right as shown in FIGURE 4 is an auxiliary printing mechanism including a symbol die 90 slidably supported in an aperture 92 in the upper surface of 60. The die 90 is supported and driven by a wedge surface 94 on a sliding block 96 supported by a plate 97 secured to 60. A solenoid 98 is connected to drive 96 in horizontal movement to drive 90 up or permit it to move down. In this way substantially all the appreciable vertical loading of 96 during imprinting is taken by the plate 96 and not by the solenoid or its linkage. When 90 is up the symbol on the upper surface is positioned to be engaged by the auxiliary roller through the record R as the roller passes thereover, as shown in FIGURE 5.

Referring now to the reader/imprinter mechanism, FIGURES 2 and 3 reveal that the drive link 34 is connected to a shaft 100 which extends across and is held by the arms of a yoke 102. The yoke is secured for pivotal movement by shafts 44 and 45 from an initial position shown in FIGURE 2 to the position of FIGURE 4, fully forward and return. Between the arms of 102 is the reader head 104 which includes a series of spring members carrying contacts 106 projecting from the lower face thereof as shown in FIGURE 2. The arm 108 is affixed to the right arms of 102 to follow the movement of the reader head 104, as previously mentioned.

As link 34 is driven to reciprocate back and forth the reader head 104 is driven clockwise from the position of FIGURE 2 toward the upper surface of 60 as shown in FIGURE 4. The card C thereon is engaged by springs 106 with center of such springs being driven through the apertures therein to engage conductive pads shown as 110 embedded in the upper surface of 60. These pads are suitably energized so that current may flow through selected contacts to develop signals in accordance with the pattern of apertures A identifying the card. By suitable means not shown these signals are transmitted to cause the credit status of the card holder to be examined with control signals returned to cause further operation of the unit. A preferred reader construction is taught in the previously mentioned Loose application.

Also mounted on yoke 102 is the roller mechanism including arms 112 and 114 pivotally connected to the ends of shaft 100. As shown in FIGURES 2 and 3 a pair of springs 116 and 118 are attached to the forward top of each side of 102. The spring 116 is attached forward and to the top of arms 114 and operable to pull 114 anticlockwise relative to the yoke 102 and reader head 104 when in the position of FIGURE 2 but clockwise when in the position of FIGURE 4. The spring 118 is tied to the arm 112 in a similar manner for a similar purpose. The arm 114 includes an enlarged surface carrying an arcuate slot 120 and an arm 122 which may be adjusted to set the main roller 130 in the manner disclosed in the previously mentioned Dechert et al. application. The arm 112 has a side view apparent from FIGURES 2 and 3.

The main roller 130 is supported between 112 and 114 on a shaft 132 which includes projecting ends 134 and 136 which extend out to overlie rails 64 and 70 as shown in FIGURE 3. The end 134 does not overlie portion 66 of rail 64 and is free therefrom. End 136 does extend out to engage the enlarged end 52 of gate 50.

The main body of the roller 130 is placed to one side on shaft 132 to accommodate a link 140 shown in FIGURES 2 and 3 to project outwardly, forward of 130. Mounted on link 140 is shaft 142 carrying auxiliary roller 144. The link 140 is supported for pivotal movement on shaft 132 and limited against free rotation by a pin 148 secured in arm 112 which catches the lower edge surface of 140. The auxiliary roller 144 is thus "piggy-backed" onto the main roller to follow generally movement laterally under drive from 34 and 102. The outside end 146 of shaft 142 is made to project over to overlie rail 68 and the project sloped portion 66 of rail 64.

*Operation*

With the components and functions of unit 10 now in mind several variations or control are possible. The unit may be operated in four modes to: (1) read without printing at all; (2) read with main roller printing and without auxiliary roller printing; (3) read with both main and auxiliary roller printing; or (4) read without main roller printing but with auxiliary roller printing.

Reviewing mode (1) operation and assuming placement of records C and R and depression of operate button 14, the motor 22 is energized to drive the linkage forward from the position of FIGURE 2 to the position of FIGURE 4. The roller shaft ends 134 and 146 will contact the rails 64 and 68 and move therealong; end 134 moving out onto gate portion 52 and 146 moving down 66 and beneath 68.

When the mechanism is in the position of FIGURE 2 the springs 116 and 118 hold the rollers up. As the mechanism moves toward the position of FIGURE 4 these same springs force the rollers down until the shafts thereof engage the rails and gate as described. On return the springs will again drive the rollers upward.

The reader 104 will read the card C to transmit an identifying signal to an accounting center. Assume now that no signal is returned to operate solenoid 92 or solenoid 98. The main roller at this time will be held up as shown in FIGURE 4 by the engagement of shaft end 136 with gate 52, the rear surface thereof. The rod 86 will hold the gate up even though block 82 is depressed by 108. The roller 144 will have passed under 68 to the position shown in FIGURE 4. The drive will then draw the yoke 102 back up in an anticlockwise direction to drive the reader upward and the roller linkage to the left. Roller 130 will not effect a printing of the record R because the shaft end 136 will be held up on gate portion 52 and the sides 134 and 136 will ride back on the top of rails 64 and 70. Roller 144 will be biased down by the engagement of its shaft 146 with the bottom of rail 68. The die 90 will, however, not effect an imprinting because the solenoid will not have been operated. The drive mechanism will continue until restored to the position of FIGURE 2 and no imprinting will have resulted.

Figure 6:
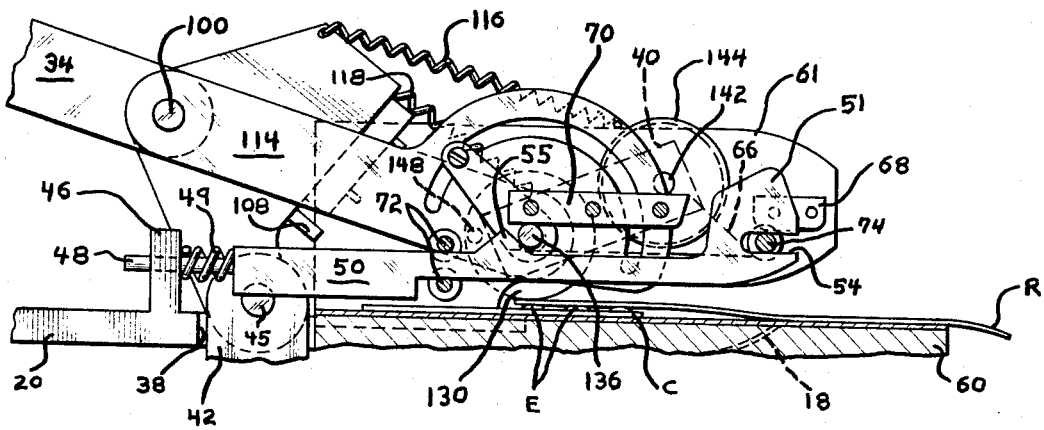
FIGURE 6 is a side view in partial section of the structure previously shown, but in a position of operation just following imprinting and preparatory to being restored to the initial position as shown in FIGURE 2.

Turning now to mode (2) operation, energization of the motor will again cause a reading of the card as previously described. Assume now that a signal is returned to operate 92 but not 98. The gate 50 will be freed as soon as rod 86 is drawn down by 92 and as soon as the reader is in proper position with 108 displaying block 82. The gate 50 will move to the right under pressure of 54 to the position shown in FIGURE 5, permitting the main roller 130 to drop down. At this time the auxiliary roller 144 will have passed down the ramp formed by 66 to be biased against the record R over the die. The die will, however, be shown (not as shown in FIGURE 5) since 98 is unenergized. The main roller will then be drawn back biased by the bottom surface of rails 64 and 70 in engagement with the roller shaft ends 134 and 136 to imprint the record R with the embossment E on record C. When the shaft of the main roller reaches the position of FIGURE 6 the shaft end 136 will engage the projection 55 on gate 50 to drive the gate back to the position of FIGURE 2; block 82, then released from 108, now moving upward to lock the gate in position by engagement with slot 56 as shown in FIGURE 3. The record R will have been imprinted only with the embossment and not by the die 90.

Mode (3) operation is effected in a fashion identical to mode (2) operation but with displacement of the die 90 upwards as shown in FIGURE 5.

Mode (4) operation is effected in a fashion identical to that of mode (1) but with die displacement by energization of solenoid 98.

While emphasis has been placed on commercial transmissions it should be apparent that the invention apparatus would be useful in many other record reading/imprinting applications whereon imprinting must be controlled dependent upon what is first read. Timekeeping, security checking, process flow in manufacturing and other such applications frequently rely upon similar record requirements and call for safeguards against false reader/imprinter operation.

It should also be apparent that the roller and imprinting control could be separately utilized without a reader. The control signals would in such event be developed responsive to data sent from a unit station by other means, such as a transmission of card holder identification by voice or by keyboard or telephone dial impulse.

Having now described a reader/imprinter apparatus in a mode intended to enable a preferred practice thereof, the following claims are asserted to define the invention therein.

What is claimed is:

1. In an apparatus for use with information bearing records, a housing having a printing platen adapted to receive printing means thereon with a record positioned over said printing means, a record receiving opening at one end, means including a roller and a roller drive mechanism operable to drive said roller out toward said opening and return therefrom over said platen and over the printing means and record disposed on said platen, roller guide means defining an out path and two return paths, including one return path wherein said roller is free from bearing contact with said platen and another path wherein said roller is forced against said platen to effect a printing of a record thereon by forcing the record against the printing means, means including a gate member disposed in said housing proximate the end of outward movement operable in either of two positions to cause said roller to return from said opening in either of said two return paths, and control means located within said housing well away from said opening and operable to hold or displace said gate member to provide control over return movement.

2. The apparatus of claim 1 wherein said control means includes further drive means separate from the said roller drive mechanism to displace said gate.

3. The apparatus of claim 1 wherein said control means includes a mechanical drive means to displace said gate and a solenoid driven blocking member to hold said gate member by locking gate movement under said mechanical drive means.

4. The apparatus of claim 1 wherein said control means includes further drive means separate from said roller drive mechanism to displace said gate member and means are provided responsive to said roller drive mechanism to restore said gate member to a holding position.

5. The apparatus of claim 1 wherein there is included a reader mechanism secured in said housing operable to read a record on said platen in response to operation of said roller drive mechanism, the said reader mechanism being positioned in said housing in the out path to be operated before said roller reaches said gate member whereby to permit a reading of said record before operation of said gate member to cause roller return in either of said two paths.

6. In an apparatus for use with information bearing records, a printing platen adapted to receive printing means and means to position records to be printed over the printing means on the platen, a roller and a first drive mechanism to drive said roller over said platen, means secured to said platen operable to guide said roller in a first path free of said platen, printing means and a record thereon and in a second path forced down against the platen, printing means and a record thereon, gate means including a portion located at the end of said first path and including a spring drive, said gate means portion being operable independently of said first drive mechanism to block said roller from return in said second path whereby to block printing and operable in response to a separate input signal to said spring drive to be displaced to permit roller return in said second path to effect printing.

7. The apparatus of claim 6 wherein the said gate means includes means engaged by said roller in return movement to restore said gate means portion to a blocking position.

8. The apparatus of claim 6 including a spring driven lock operable to lock said gate means portion to a blocking position in response to being restored.

9. The apparatus of claim 6 including a pair of lock means operable to lock said gate means portion against displacement to permit printing, one of said lock means being mechanically released by operation of said first drive mechanism and the other of said lock means being released in response to an input separate from said first drive mechanism.

10. The apparatus of claim 6 wherein there is included a reader driven by said first drive mechanism to be forced against said platen and printing means thereon to read a record on said platen during first movement of said roller in said first path and there is included lock means operable normally to lock said gate means portion against displacement and operable as said reader is forced against said platen to free said gate means portion for displacement.

11. The apparatus of claim 10 including a further lock means released by said separate input signal to permit operation of said spring drive.

12. In an apparatus for imprinting records, a base and a record and imprinting means receiving platen, drive means secured on said base and a drive linkage connected thereto for movement outward and return across and over said platen, a roller carried by said linkage and spring means connected to said linkage and to said roller, the said linkage having means operable to cause said spring means to vertically support said roller free of platen engagement during outward movement and then toward the end of roller movement to bias said roller downwardly into engagement with said platen and means secured to said platen to hold said roller in bearing contact with said platen to cause an imprinting of records thereon during return movement of said linkage.

13. In an apparatus for use with information bearing records, a base having at one end a record and printing means receiving platen, drive means secured to said base and a roller linkage connected thereto to be driven thereby outward and return over said platen in an operating cycle, a main roller having a main shaft carried by said linkage and support means disposed on each side of said platen to receive and support said main roller by contact with said shaft, an auxiliary roller mounted on an auxiliary shaft carried by said main roller shaft, said support means including means to receive said auxiliary shaft to force said auxiliary roller against said platen, printing means and records thereon during certain operating cycles of said drive in providing outward and return movement of said linkage, and separate control means operable to either force said main roller to engage said platen or remain free therefrom to selectively cause or block printing thereby during a given operating cycle of said drive.

14. The apparatus of claim 13 wherein said auxiliary roller shaft is carried ahead of said main roller relative to outward movement and there is included a pivotal connection with said main shaft whereby said auxiliary roller is relatively free in a vertical sense.

15. In an apparatus for use with information bearing records, a base, a record and printing means receiving platen secured thereto, drive means and a drive linkage secured thereto to be driven in outward and return movements over said platen as an operating cycle, roller means including roller surfaces carried by said linkage, receiver means positioned adjacent said platen adapted to receive said roller means toward the end of said outward movement, said receiver means being operable to block or cause bearing contact of a first portion of said roller surfaces with said platen on the return movement of said linkage, and operable to cause bearing contact of a second portion of said roller surfaces with said platen near the end of outward movement in each operating cycle whereby to provide a selective printing action.

16. The apparatus of claim 15 including a separate imprinting means including an imprinting surface located in said platen to be contacted by said second portion of said roller surface and control means therefor to selectively displace said imprinting surface to cause said second surface to imprint on said record.

17. The apparatus of claim 15 including a reader mechanism driven by said drive linkage and connected to read a first record on said platen prior to the end of the outward movement of said drive linkage and including first control means to control said receiver means to cause said first roller surface to bear against said platen and a second record thereon following a reading of said first record.

18. The apparatus of claim 17 including a second control means including an imprinting surface operable to cause the said second portion of said roller surface to bear against the platen to imprint on said second record.

References Cited
UNITED STATES PATENTS

| | | | |
|---|---|---|---|
| 2,043,600 | 6/1936 | Ward | 101—274 X |
| 2,994,265 | 8/1961 | Hurlbut et al. | 101—269 |
| 3,018,725 | 1/1962 | Maul et al. | 101—269 |
| 3,048,097 | 8/1962 | Miller | 101—306 X |
| 3,152,543 | 10/1964 | Hanson et al. | 101—269 |
| 3,188,949 | 6/1965 | Hill | 101—269 |
| 3,260,199 | 7/1966 | Huntley et al. | 101—283 |
| 3,272,120 | 9/1966 | Johnson | 101—56 |

WILLIAM B. PENN, *Primary Examiner.*